April 6, 1943.  C. D. RICHARDSON  2,315,735
METHOD OF AND APPARATUS FOR BLOWING MINERAL WOOL
Filed May 15, 1940
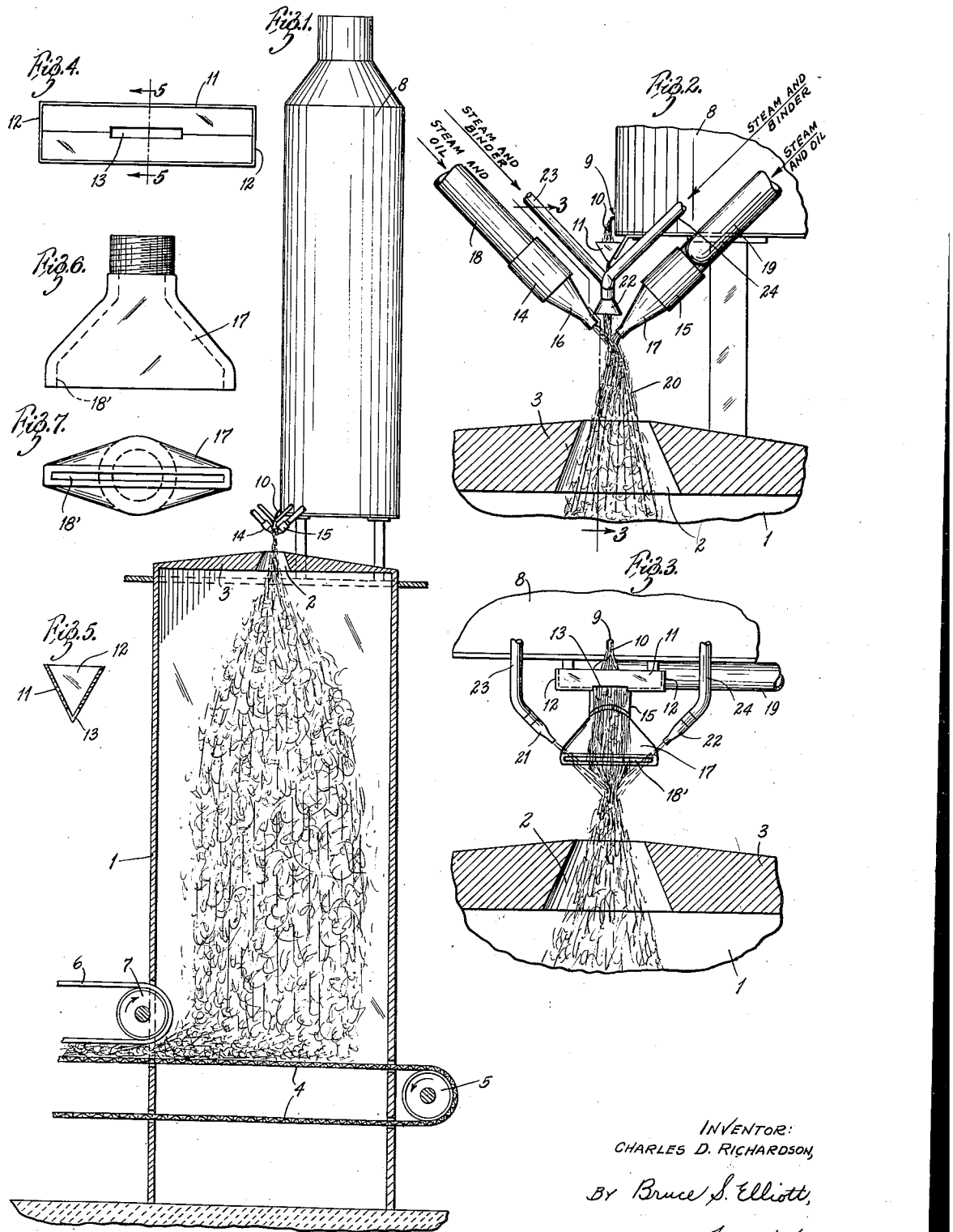
INVENTOR:
CHARLES D. RICHARDSON,
By Bruce S. Elliott,
ATTORNEY.

Patented Apr. 6, 1943

2,315,735

UNITED STATES PATENT OFFICE 2,315,735

METHOD OF AND APPARATUS FOR BLOWING MINERAL WOOL

Charles D. Richardson, Alexandria, Ind., assignor to National Gypsum Company, Buffalo, N. Y., a corporation of Delaware Application May 15, 1940, Serial No. 335,396

14 Claims. (Cl. 49—1)

The general object of this invention is to provide a novel method of and apparatus for blowing mineral, rock, or slag wool in a system employing a down-draft chamber, whereby oil and binding material, either or both, may be effectively applied to the blown molten material.

In a prior patent, No. 1,928,388, issued to Oliver F. Mottweiler and myself Septemper 26, 1933, there is described and claimed a novel method and means for applying a binding material to the blown mineral wool under pressure just prior to the projection of the shredded material into the blow chamber. In this invention, the use of a conventional blow chamber was contemplated. Such a blow chamber comprises a relatively long, narrow chamber having an endless conveyor mounted therein of the width of the chamber, and mounted to travel in a horizontal plane at such speed that when the mineral wool deposited thereon by being blown into the chamber at one end, has been carried by the conveyor through an outlet at the other end, a desired thickness of mineral wool will have been deposited, said material being usually passed between rollers located at the outlet end of the blow chamber and compressed.

In a companion application, filed of even date herewith, I have shown and described a downdraft system of blowing mineral wool; that is to say, a system in which the blow chamber is vertically disposed, the mineral wool being blown in at the top and deposited on an endless conveyor operating in the bottom of the blow chamber.

In the practice of the present invention, I employ such a vertically-disposed blow chamber, and follow, in a broad sense, the method of the prior patent referred to, but I have devised a novel construction and arrangement of nozzles, both for applying the steam blast carrying oil in blowing the mineral wool, and for applying binding material thereto, which is particularly adapted for use with a vertically disposed blow chamber, and which will enable the maximum effective application of the treating material, or treating materials, thereto.

My invention also comprises the provision of novel means for delivering the molten material in a continuous, ribbon-like stream, whereby, in conjunction with my improved construction and arrangement of nozzles, the maximum shredding effect is secured, and the production of "shot,"— that is, glass pellets which have cooled before being dissipated into fibers,—is greatly reduced. When such blowing of the mineral wool is practiced in connection with my improved chamber, the production of shot is practically entirely eliminated.

In conventional methods of blowing mineral wool, as above briefly referred to, a considerable quantity of the shredded material is lost by reason of the outer portion of the projected spray striking the end wall of the blow chamber surrounding the opening through which the shredded material is blown into the chamber. It is practically impossible to prevent this, as it is not practicable to increase the size of the opening, as this would permit the entrance of too much cold air into the blow chamber; and funnel shaped guides, or similar means, intended to guide the projected material into and through the opening are equally impracticable, as the globules striking the sides thereof are cooled and their speed arrested, greatly increasing the production of shot.

By my novel arrangement and construction of blow caps, or nozzles, I am not only enabled to decrease the size of the opening through which the shredded material is projected into the blow chamber, but the spray of molten material is prevented from spreading outward, and forced to travel in an approximately straight path of less area than the opening, due to the disposition of the nozzles whereby contact with the wall surrounding the opening is prevented and a great saving in material is effected.

With these general objects and purposes in view, my invention has for one of its special objects the provision of means for delivering the stream of molten material to be blown in the form of a flat, relatively thin stream; or, in other words, a stream that is substantially rectangular in cross-section.

Another special object of the invention is to provide a disposition of nozzles such that a blast of steam and oil will impinge at different elevations against opposite sides of the flat molten stream to shred the material, while a second pair of nozzles will direct blasts of steam and binder in a downward direction against opposite sides of the projected spray, preventing its outward spread, and confining it to a path of movement of less area, as stated, than the opening through which the material is projected.

The invention is illustrated in the accompanying drawing in which—

Fig. 1 is a view partly in elevation and partly in section showing a vertical blow chamber having a cupola mounted thereon;

Fig. 2 is a view on an enlarged scale showing a portion of the upper part of the blow chamber and a portion of the lower end of the cupola, and illustrating my improved arrangement of nozzles for blowing the mineral wool and applying binding material thereto;

Fig. 3 is a sectional view taken on the line 3—3 of Fig. 2 and viewed in the direction of the arrows;

Fig. 4 is a plan view on an enlarged scale of the trough for receiving the molten material flowing from the cupola and delivering a flat, or ribbon-like stream of the same to the blow nozzles;

Fig. 5 is a cross-section of Fig. 4, taken on the line 5—5;

Fig. 6 is an enlarged view in side elevation of one of the blow caps, or nozzles; and Fig. 7 is a bottom plan view of the same.

Referring now to the drawing, the numeral 1 indicates a vertical blow chamber having an opening 2 in its top 3, the walls of which opening preferably diverge in a downward direction as shown. The blow chamber 1 is rectangular in shape and extending through openings in opposite end walls thereof near its lower end are the flights of an endless conveyor 4, of the same width as the blow chamber, one end of which is mounted on a pulley 5, and the other end of which is mounted on a similar driven pulley (not shown). Mounted above conveyor 4, and positioned so that its lower flight runs in a path a suitable distance above the upper flight of the conveyor 4, is an endless conveyor 6, one end of which is shown mounted on a pulley 7, and the other end of which will be mounted on a driven pulley (not shown) as in the case of the conveyor 4. Mounted above the blow chamber 1, is a cupola 8, in which the rock, slag, or other mineral matter, is melted in the usual way. Near its lower end the cupola 8 is provided at one side with a small opening 9 (Fig. 3) through which the molten material is allowed to flow from the cupola. Ordinarily this stream of molten material, indicated by the numeral 10 in Figs. 2 and 3, is directly acted on by the steam blast after it has fallen a short distance below the bottom edge of the cupola. This stream is substantially round, and relatively thick, so that the disintegration, or shredding thereof is not always entirely uniform, and the sprayed material is projected, at first in the form of globules, or droplets, taking widely diverging paths, so that, as I have stated, a considerable quantity of the matter thus projected strikes against the wall surrounding the opening into the blow chamber, occasioning considerable loss.

One of the important features of my invention consists of the provision of a trough 11, Figs. 2, 4 and 5, of the shape in cross-section of the letter V, which is closed at its ends, as indicated at 12, and is provided centrally of its bottom, or apex, with an elongated, rectangular opening 13, and into which trough the molten material flows directly from the cupola, as shown by Fig. 2, and from which the material flows through the opening 13 in a flat, or ribbon-like stream, which is relatively thin as compared with the thickness of the stream flowing from the cupola, and of uniform thickness throughout its width. Such a stream, when steam blasts are caused to impinge on both sides thereof, is more readily blown into fibers of uniform size than when a round stream is acted on by a steam blast directed only against its under side, as in conventional methods of blowing mineral wool.

Mounted a suitable distance below the trough 11 are two blow caps, 14 and 15, respectively, the nozzle portion 16 of blow cap 14 having its lower end positioned at a higher level than the lower end of the nozzle 17 of blow cap 15. Each of these blow caps is connected by means of branch pipes 18 and 19, respectively, with a source (not shown) of high pressure steam, and into the steam line oil is admitted, so that the resultant blasts issuing from the nozzles 16 and 17 not only act to shred the molten material, but to apply oil thereto, which tends to make the fibers less brittle, and which operates to decrease the production of dust in the blow chamber. As shown by Figs. 3 and 7, the discharge opening 18' of the nozzles 16 and 17 is elongated and rectangular in form, and considerably wider than the opening 13 in trough 11 through which the molten material flows between the blow caps, insuring that the full width of the molten stream will be acted on by the blasts.

It is necessary to have some spread of the shredded material to permit the fibers to form, and also to deposit over the entire surface of the conveyor 4. It is also necessary, of course, to project the shredded material downward through the opening 3 in the top of the blow chamber. If the lower ends of the nozzles 16 and 17 were located directly opposite each other, the tendency would be to blow the globules into contact with each other and interfere with the streaming of the globules necessary to form the mineral wool fibers. To accomplish both the shredding and spreading actions, and at the same time to control the extent of the latter, I position the nozzles 16 and 17 at different elevations so that the shredding action of the nozzle 16 will be supplemented by the shredding action of the nozzle 17, and the angular line of force of the blast from nozzle 16 will be counteracted by the angular line of force from the nozzle 17, and the path of projection of the shredded particles will be a composite of the two forces, causing the spray of material to pass directly through the opening 3, as illustrated in Fig. 2. This projected spray, indicated by the numeral 20, will spread out, or assume a conical-shape, as indicated, and the walls of the opening 3 diverge downwardly, as shown, to permit this spreading action and prevent the globules from impinging against the sides of the opening.

Located slightly above the lower ends of the nozzles 16 and 17, and between the same, are two similar, but smaller nozzles, 21 and 22, which communicate by means of branch pipes 23 and 24 with a source (not shown) of high pressure steam, the steam line of the latter being connected with a source (not shown) of a suitable binding material, such an arrangement being indicated sufficiently, both as to the steam and oil blasts, and binder blasts, by suitable inscriptions applied to the corresponding pipes.

As shown by Fig. 3, the nozzles 21 and 22 are located slightly to one side of the respective sides of the nozzles 16 and 17, and direct the blast of steam and binding material in a downwardly inclined direction, or in converging paths against the shredded stream of molten material produced by the blast nozzles 16 and 17, so as to apply the binding material to the body of shredded material under pressure, whereby the binding material will be thoroughly incorporated with the shredded molten material and uniformly dispersed over the mineral wool fibers, thus obtaining the advantages of the method of applying binding material to mineral wool fibers described and claimed in the Letters Patent referred to above.

At the same time, by locating the nozzles 21 and 22 as shown and described, the blasts from said nozzles serves to limit the lateral spread of the projected fibers produced by the nozzles 16 and 17, so that practically none of the projected molten material will strike upon the portion of the top of the blow chamber surrounding the opening 2 therein.

The mineral wool fibers, formed by the shredded material as it passes downward through the blow chamber, settle upon the conveyor 4 and are continuously removed from the chamber in the usual way, the thickness of the deposit depending upon the speed of movement of the conveyor.

While I do not limit myself to the particular height of the blow chamber 1, I will simply say that I have found in actual practice that my improved method of blowing the mineral wool enables me to use vertical blow chambers which are considerably less in height than the corresponding linear dimension of the horizontal blow chambers now commonly employed.

I claim:

1. The method of blowing mineral wool, which consists in sequentially directing downward blasts of steam against opposite sides of a downwardly flowing stream of molten material in a manner to produce a composite of the forces of the blasts acting to project the resultant shredded material downwardly through, and confine the same to, a zone of dispersion of substantially definite area directly to a place of deposition.

2. The method of blowing mineral wool which consists in downwardly directing blasts of steam at different elevations against opposite sides and in the general direction of flow of a downwardly flowing stream of molten material to produce a composite of the forces of the blasts acting to project the resultant shredded material in the same direction as the flow of said stream through, and confine the same to, a zone of dispersion of substantially definite area directly to a place of deposition.

3. The method of blowing mineral wool which consists in directing blasts of steam in a downward direction and at different elevations against opposite sides of a downwardly flowing stream of molten material to produce a composite of the forces of the blasts acting to project the resultant shredded material in the same direction as the flow of said stream through, and confine it to, a zone of dispersion of substantially definite area directly to a place of deposition.

4. The method of blowing mineral wool which consists in directing blasts of steam in a downward direction and at different elevations against opposite sides of a stream of molten material to produce a composite of the forces of the blasts, and projecting the resultant shredded material by the force of the composite blast downwardly through a zone of dispersion restricted in area by said blasts and directly through an opening of slightly greater area formed in a receiving chamber of relatively large horizontal cross section.

5. The method of blowing mineral wool which consists in directing blasts of steam against opposite portions of a stream of molten material, and simultaneously directing blasts of steam and binding material against opposite portions of said stream displaced from the first said portions by an angle of approximately 90°, whereby to cause the shredded material to be projected through a zone of dispersion of substantially definite area directly to a place of deposition.

6. The method of blowing mineral wool through a relatively small opening in the top of a vertical blow chamber of relatively large horizontal cross section, which consists in causing molten material to flow downwardly in a flat, relatively thin stream, and directing spaced blasts of steam in a downward direction against opposite sides of said stream to cause the resultant shredded material to be projected through said opening while confined by said blasts to a zone of dispersion of less area than the area of said opening.

7. The method of blowing mineral wool through a relatively small opening in the top of a vertical blow chamber of relatively large horizontal cross section which consists in causing molten material to flow in a flat, relatively thin stream, and directing blasts of steam in a downward direction, at different elevations against opposite sides of said stream displaced by approximately 90° to cause the resultant shredded material to be projected through said opening while confined by said blasts to a zone of dispersion of less area than the area of said opening.

8. The method of blowing mineral wool through a relatively small opening in the top of a vertical blow chamber of relatively large horizontal cross section which comprises causing molten material to flow in a flat, relatively thin stream of restricted width, and directing blasts of steam in a downward direction and at different elevations against opposite sides of said stream, the composite of the forces of said blast operating to project the shredded material produced by said blasts downwardly through said opening, while confined to a zone of dispersion of less area than the area of said opening.

9. The method of blowing mineral wool through a relatively small opening in the top of a vertical blow chamber of relatively large horizontal cross section which comprises causing the flow of a stream of molten material, directing blasts of steam in a downward direction and at different elevations against opposite sides of said stream, the composite of the forces of said blasts operating to project the shredded material produced by the blasts downwardly through said opening, while confined to a zone of dispersion of less area than the area of said opening.

10. The method of blowing mineral wool through a relatively small opening in the top of a vertical blow chamber of relatively large horizontal cross section, which consists in causing molten material to flow in a stream, projecting blasts of steam in a downward direction and at different elevations against opposite portions of said stream to shred and project the molten material toward said opening, and simultaneously directing blasts of steam containing binding material in downwardly converging paths at the portions of the path of the shredded material produced by the first-named blasts the second said portions being substantially at right angles to the first said portions, the combined forces of said blasts operating to project the shredded material with the binder applied thereto through said opening while confining the same to a zone of dispersion of less area than the area of said opening.

11. In combination with a vertical blow chamber of relatively large horizontal cross section having a relatively small opening in its top, and of a height to permit shredded molten particles projected through said opening to elongate into fibers before deposition at the bottom of said chamber, a cupola located above said blow chamber and having an outlet for delivering a stream of molten material, a pair of blow caps having nozzles, one of which is located at a higher elevation than the other, said nozzles being adapted to direct blasts of steam in a downward direction against opposite sides of the stream of molten material and thereby project the shredded material produced thereby downwardly through said opening.

12. In combination with a vertical blow chamber of relatively large horizontal cross section having a relatively small opening in its top, and of a height to permit shredded molten particles projected through said opening to elongate into fibers before deposition at the bottom of said chamber, a cupola located above said blow chamber and having an opening for delivering a stream of molten material, a pair of blow caps having nozzles, one of which is located at a higher elevation than the other, said nozzles being positioned with respect to one another to direct blasts of steam in a downward direction against opposite portions of the stream of molten material and thereby project the shredded material produced by the blasts downwardly towards said opening, and a second pair of blow caps having nozzles, directed towards one another and towards portions of said stream displaced by approximately 90° with respect to the first said portions, the last said nozzles being adapted to direct blasts of steam and binding material in converging paths at opposite portions of the path of the shredded material produced by said first-named blasts, the arrangement being such that the combined forces of said blasts will operate to project the shredded material with the binder applied thereto through said opening while confining the same to a zone of dispersion of less area than the area of said opening.

13. In combination with a vertical blow chamber of relatively large horizontal cross section having a relatively small opening in its top, and of a height to permit shredded molten particles projected through said opening to elongate into fibers before deposition at the bottom of said chamber, a cupola located above said blow chamber and having an opening for permitting the flow of molten material therefrom, a V-shaped trough positioned to receive the flow of molten material and having a relatively narrow rectangular opening in its bottom, or apex, for delivering the molten material in a flat stream, a pair of blow caps having nozzles with elongated downwardly directed discharge openings, one of said nozzles being located at a higher elevation than the other, and said nozzles being adapted to direct blasts of steam against opposite sides of said flat stream of molten material and thereby shred the same and project the shredded particles downward through the opening in the blow chamber.

14. In combination with a vertical blow chamber of relatively large horizontal cross section having a relatively small opening in its top, and of a height to permit shredded molten particles projected through said opening to elongate into fibers before deposition at the bottom of said chamber, a cupola located above said blow chamber and having an opening for permitting the flow of molten material therefrom, a V-shaped trough positioned to receive the flow of molten material and having a relatively narrow rectangular opening in its lower end, or apex, for delivering the molten material in a flat stream, a pair of blow caps having nozzles provided with elongated discharge openings, said nozzles being positioned with respect to one another to direct blasts of steam in a downward direction against opposite sides of the flat stream of molten material and to project the shredded particles produced by the blast downward toward said opening in the blow chamber, and a pair of blow caps having nozzles directed toward one another and towards sides of said stream displaced by approximately 90° from the first said sides, and adapted to direct blasts of steam containing binding material in a downward direction and in converging paths at opposite sides of the path of the shredded material projected downward by the first-named blow caps, the arrangement being such that the combined forces of said blasts will operate to project the shredded material with the binder applied thereto through said opening while confining the same to a zone of dispersion of less area than the area of said opening.

CHARLES D. RICHARDSON.